United States Patent
Fukui (10) Patent No.: US 10,773,583 B2
(45) Date of Patent: Sep. 15, 2020

(54) VEHICLE LOWER STRUCTURE

(71) Applicant: TOYOTA JIDOSHA KABUSHIKI KAISHA, Aichi-ken (JP)

(72) Inventor: Ryosuke Fukui, Aichi-ken (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 16/294,823

(22) Filed: Mar. 6, 2019

(65) Prior Publication Data
US 2019/0275875 A1 Sep. 12, 2019

(30) Foreign Application Priority Data
Mar. 9, 2018 (JP) .................. 2018-042756

(51) Int. Cl.
| | | |
|---|---|---|
| *B60K 1/04* | (2019.01) | |
| *B62D 25/20* | (2006.01) | |
| *B62D 21/03* | (2006.01) | |
| *B62D 21/11* | (2006.01) | |

(52) U.S. Cl.
CPC ............ *B60K 1/04* (2013.01); *B62D 21/03* (2013.01); *B62D 21/11* (2013.01); *B62D 25/20* (2013.01); *B60K 2001/0438* (2013.01)

(58) Field of Classification Search
CPC ............ B60L 50/64; B60K 2001/0438; B60K 2001/0472
USPC ........................................... 180/68.5
See application file for complete search history.

(56) References Cited

U.S. PATENT DOCUMENTS

| | | | | |
|---|---|---|---|---|
| 6,109,654 A * | 8/2000 | Yamamoto | ............ | B62D 21/152 180/299 |
| 6,227,322 B1 * | 5/2001 | Nishikawa | ............ | B60R 16/04 180/65.1 |
| 7,070,015 B2 * | 7/2006 | Mathews | ............ | B60K 1/04 180/68.5 |
| 7,610,978 B2 * | 11/2009 | Takasaki | ............ | B60K 1/04 180/68.5 |
| 7,654,351 B2 * | 2/2010 | Koike | ............ | B60K 1/04 180/68.5 |
| 7,717,207 B2 * | 5/2010 | Watanabe | ............ | B60K 1/04 180/68.5 |
| 7,886,861 B2 * | 2/2011 | Nozaki | ............ | B60K 1/00 180/232 |

(Continued)

FOREIGN PATENT DOCUMENTS

JP 2015-615 A 1/2015

*Primary Examiner* — Jeffrey J Restifo
(74) *Attorney, Agent, or Firm* — Hauptman Ham, LLP (57) ABSTRACT

A vehicle lower structure includes: a floor of a vehicle; a cross member that is provided under the floor and extends in a vehicle width direction; a battery pack mounted under the floor; a suspension member with which a movable part of a suspension is connected so that the movable part is able to operate, the suspension member being positioned on a front side or a rear side of the battery pack and fixed to a vehicle body; and a hanging bracket that is hung from the cross member and is connected with an end surface of the battery pack on a suspension member side by a fastening component such that the hanging bracket supports the battery pack in a hanging manner. The battery pack and the hanging bracket are connected with each other below the suspension member.

12 Claims, 5 Drawing Sheets

(56) References Cited

U.S. PATENT DOCUMENTS

| | | | | |
|---|---|---|---|---|
| 8,037,960 B2 * | 10/2011 | Kiya | B60K 1/04; 180/68.5 |
| 8,051,934 B2 * | 11/2011 | Kiya | B60K 1/04; 180/68.5 |
| 8,079,435 B2 * | 12/2011 | Takasaki | B60K 1/04; 180/68.5 |
| 8,602,454 B1 * | 12/2013 | Baccouche | B60K 1/04; 180/68.5 |
| 8,608,230 B2 * | 12/2013 | Young | B60K 1/04; 296/187.02 |
| 8,689,919 B2 * | 4/2014 | Maeda | B62D 21/157; 180/311 |
| 8,708,402 B2 * | 4/2014 | Saeki | B60K 1/04; 180/68.5 |
| 8,839,895 B2 * | 9/2014 | Kato | B60K 1/04; 180/68.5 |
| 8,859,126 B2 * | 10/2014 | Yamada | B60K 1/04; 429/100 |
| 8,863,877 B2 * | 10/2014 | Saeki | B60K 1/04; 180/271 |
| 8,863,878 B2 * | 10/2014 | Shirooka | B60K 1/04; 180/68.5 |
| 8,932,769 B2 * | 1/2015 | Ohashi | B62D 25/20; 429/400 |
| 8,936,125 B2 * | 1/2015 | Nakamori | B60K 1/04; 180/68.5 |
| 8,939,246 B2 * | 1/2015 | Yamaguchi | B60K 1/04; 180/68.5 |
| 9,016,765 B1 * | 4/2015 | Rawlinson | F41H 7/042; 296/187.07 |
| 9,022,152 B2 * | 5/2015 | Imamura | B62D 21/157; 180/68.5 |
| 9,034,502 B2 * | 5/2015 | Kano | B60K 1/04; 429/99 |
| 9,056,631 B2 * | 6/2015 | Nakamori | B60K 1/04 |
| 9,205,872 B2 * | 12/2015 | Okada | B62D 25/20 |
| 9,281,505 B2 * | 3/2016 | Hihara | B60K 1/04 |
| 9,283,838 B2 * | 3/2016 | Ohashi | B60K 1/04 |
| 9,409,495 B2 * | 8/2016 | Kobayashi | B60K 1/00 |
| 9,493,190 B1 * | 11/2016 | Alwan | B62D 21/157 |
| 9,517,686 B1 * | 12/2016 | Paramasivam | B60K 1/04 |
| 9,637,172 B2 * | 5/2017 | Sagara | B62D 21/155 |
| 9,643,660 B2 * | 5/2017 | Vollmer | B62D 25/2072 |
| 9,722,223 B1 * | 8/2017 | Maguire | H01M 2/1083 |
| 9,812,746 B2 * | 11/2017 | Katayama | B60K 1/04 |
| 9,853,262 B2 * | 12/2017 | Subramanian | H01M 2/1083 |
| 9,873,456 B2 * | 1/2018 | Hara | B60K 1/04 |
| 9,956,859 B2 * | 5/2018 | Ikeda | B60K 1/04 |
| 9,975,416 B2 * | 5/2018 | Hara | B62D 25/20 |
| 10,065,491 B1 * | 9/2018 | Syed | B60L 50/66 |
| 10,069,123 B2 * | 9/2018 | Maguire | H01M 2/1083 |
| 10,112,563 B2 * | 10/2018 | Ashraf | B60R 19/34 |
| 10,245,955 B2 * | 4/2019 | Nakayama | B60K 1/04 |
| 10,259,506 B2 * | 4/2019 | Ayukawa | B62D 25/2036 |
| 10,272,759 B2 * | 4/2019 | Sudhindra | B60K 1/04 |
| 10,272,949 B2 * | 4/2019 | Faruque | B60K 1/04 |
| 10,279,693 B2 * | 5/2019 | Shimizu | B62D 21/02 |
| 10,322,757 B2 * | 6/2019 | Shimoda | B60K 1/04 |
| 10,336,211 B2 * | 7/2019 | Kobayashi | B60K 1/04 |
| 10,358,048 B2 * | 7/2019 | Hara | H01M 2/1077 |
| 10,358,168 B2 * | 7/2019 | Atsumi | B62D 21/157 |
| 2009/0166116 A1 * | 7/2009 | Kiya | B60K 1/04; 180/68.5 |
| 2015/0197144 A1 * | 7/2015 | Jarocki | B60K 1/04; 180/232 |

* cited by examiner

VEHICLE LOWER STRUCTURE

INCORPORATION BY REFERENCE

The disclosure of Japanese Patent Application No. 2018-042756 filed on Mar. 9, 2018 including the specification, drawings and abstract is incorporated herein by reference in its entirety.

BACKGROUND

1. Technical Field

The disclosure relates to a vehicle lower structure.

2. Description of Related Art

A vehicle is known in which a battery pack is mounted underneath a floor. The battery pack is fixed to a structure material such as a cross member that strengthens the floor. Japanese Unexamined Patent Application Publication No. 2015-615 (JP 2015-615 A) describes a battery pack (a battery, a battery case) mounted underneath a floor by attaching the battery pack to a rear cross member on the rear side and a pair of right and left under reinforcements (rear side members) that are provided on the floor.

SUMMARY

In a vehicle in which a battery pack is mounted underneath a floor, interference between the battery pack and other components disposed below the floor can be a problem when the battery pack is attached and detached. For example, a suspension member and the battery pack itself or a tool to attach and detach the battery pack can interfere with each other. To the suspension member, a movable part of a suspension such as a suspension arm is connected. In such a case, the suspension member may need to be removed when the battery pack is attached and detached.

The disclosure provides a technique that makes it possible to attach and detach a battery pack without removing a suspension member.

An aspect of the disclosure provides a vehicle lower structure, including: a floor of a vehicle; a cross member that is provided under the floor and extends in a vehicle width direction; a battery pack mounted under the floor; a suspension member with which a movable part of a suspension is connected so that the movable part is able to operate, the suspension member being positioned on a front side or a rear side of the battery pack and fixed to a vehicle body; and a hanging bracket that is hung from the cross member and is connected with an end surface of the battery pack on a suspension member side by a fastening component such that the hanging bracket supports the battery pack in a hanging manner. The battery pack and the hanging bracket are connected with each other below the suspension member.

Since the battery pack and the hanging bracket that supports the battery pack are connected with each other below the suspension member, it is possible to connect and disconnect the battery pack and the hanging bracket without removing the suspension member.

In the above aspect, the hanging bracket may extend in a vehicle upper-lower direction in a space between the battery pack and the suspension member, and the cross member may have a lower surface with which the hanging bracket is connected, and the lower surface may face the space between the battery pack and the suspension member.

By connecting the hanging bracket to the lower surface of the cross member, dimensions of the cross member and the hanging bracket in the front-rear direction of the vehicle are reduced.

In the above aspect, the battery pack and the hanging bracket may be connected with each other below the movable part of the suspension.

According to the above configuration, the battery pack is attached and detached without removing the movable part of the suspension.

In the above aspect, the hanging bracket may be inclined in a direction so that a lower end of the hanging bracket is distanced from the battery pack.

According to the above configuration, it is possible to increase a capacity of the battery pack.

In the above aspect, the floor may include an under reinforcement provided in an end of the floor in the vehicle width direction, the under reinforcement extending in a front-rear direction of the vehicle, and the suspension member may be connected with the under reinforcements.

With the aspects of the disclosure, the battery pack and the hanging bracket are connected with each other below the suspension member. Therefore, the battery pack is attached and detached without removing the suspension member from a vehicle body.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
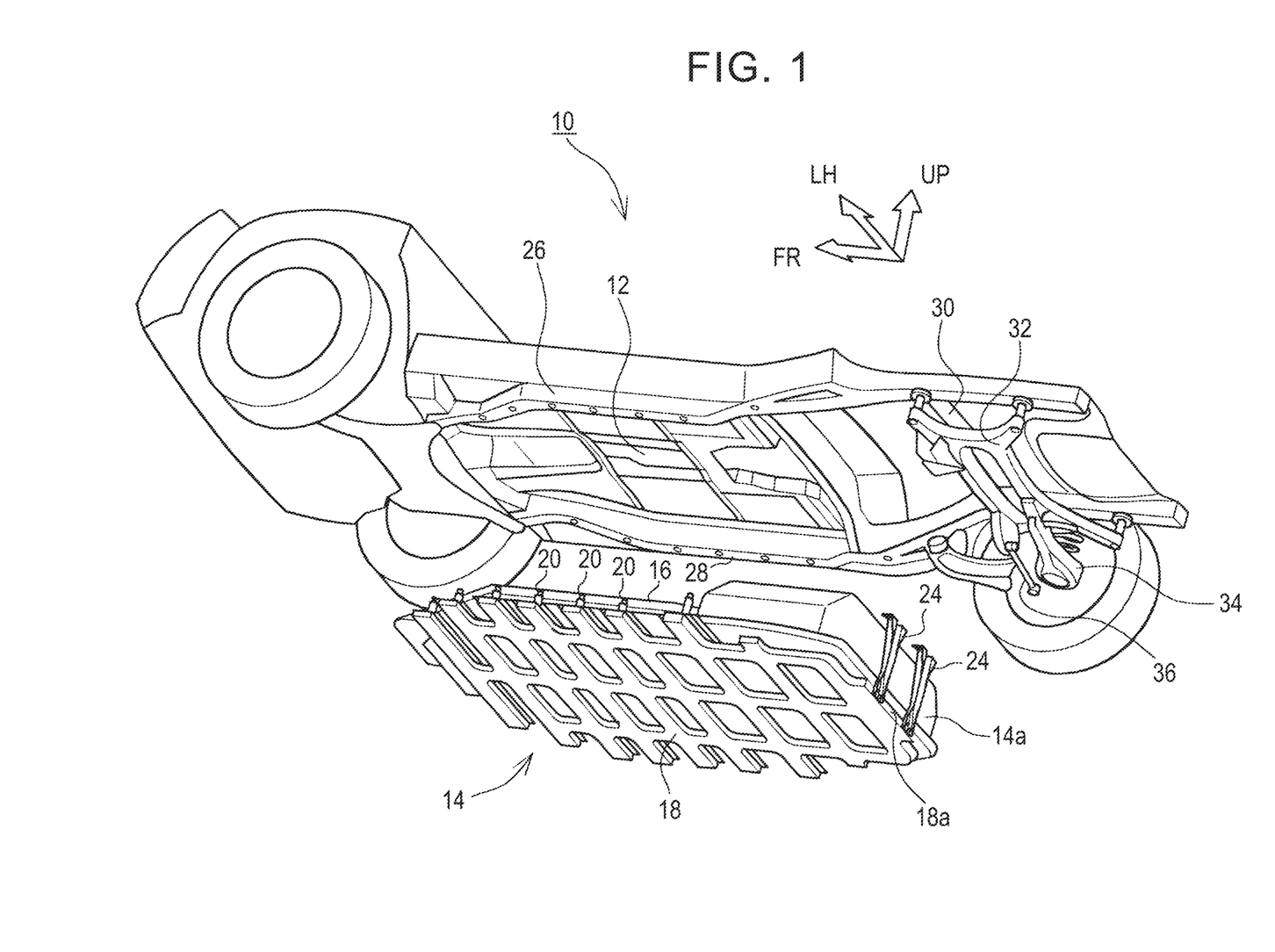
FIG. 1 is a view of a vehicle lower structure in a state where a battery pack is removed from a floor.

Hereinafter, an embodiment of the disclosure is described with reference to the drawings. FIG. 1 is a schematic view of a vehicle lower structure 10. In the drawings, an arrow FR indicates a front direction of a vehicle, an arrow UP indicates an upper direction of the vehicle, and an arrow LH indicates a left direction of the vehicle. In the description below, terms that express directions such as front, rear, left, right, upper and lower directions are directions related to the vehicle, unless otherwise specified.

A battery pack 14 that stores power to be supplied to a vehicle driving motor is mounted under a floor 12 of the vehicle lower structure 10. In FIG. 1, the vehicle lower structure 10 is shown in a state where the battery pack 14 is separated from the floor 12. The battery pack 14 includes a pack body 16 accommodating a battery, and a lattice-shaped support frame 18 disposed on a lower surface of the pack body 16. In a portion of the pack body 16 that comes underneath a rear seat of the vehicle, its dimension in an upper-lower direction is larger than a portion of the pack body 16 in front of the foregoing portion. The support frame 18 projects from the pack body 16 in a right-left direction, and the projected portions are supported on the floor 12 in a hanging manner by hanging bolts 20. Further, the support frame 18 has a rear end surface 18a that is a part of a rear end surface 14a of the battery pack 14, and the rear end surface 18a is supported on the floor 12 by hanging brackets 24 in a hanging manner.

A pair of under reinforcements 26, 28 extending in a front-rear direction is provided so that the under reinforcements 26, 28 are located under left and right edge portions of the floor 12, respectively. Further, a cross member 30 extending to the right and the left is provided so as to connect the under reinforcements 26, 28 with each other. The hanging bolts 20 are fastened to the under reinforcements 26, 28, and the hanging brackets 24 are connected with the cross member 30. Thus, the battery pack 14 is mounted underneath the floor 12.

In a vehicle body, especially under the floor 12 of the vehicle, a suspension member 32 is fixed at a position corresponding to a rear axle. The suspension member 32 is connected with the under reinforcements 26, 28. Also, movable parts of a suspension such as suspension arms 34, 36 are connected with the suspension member 32 so that the movable parts are able to operate. A rear suspension of the vehicle is of an independent suspension type, and the suspension arms 34, 36 are disposed on a relatively outer side in the right-left direction.

Figure 2:
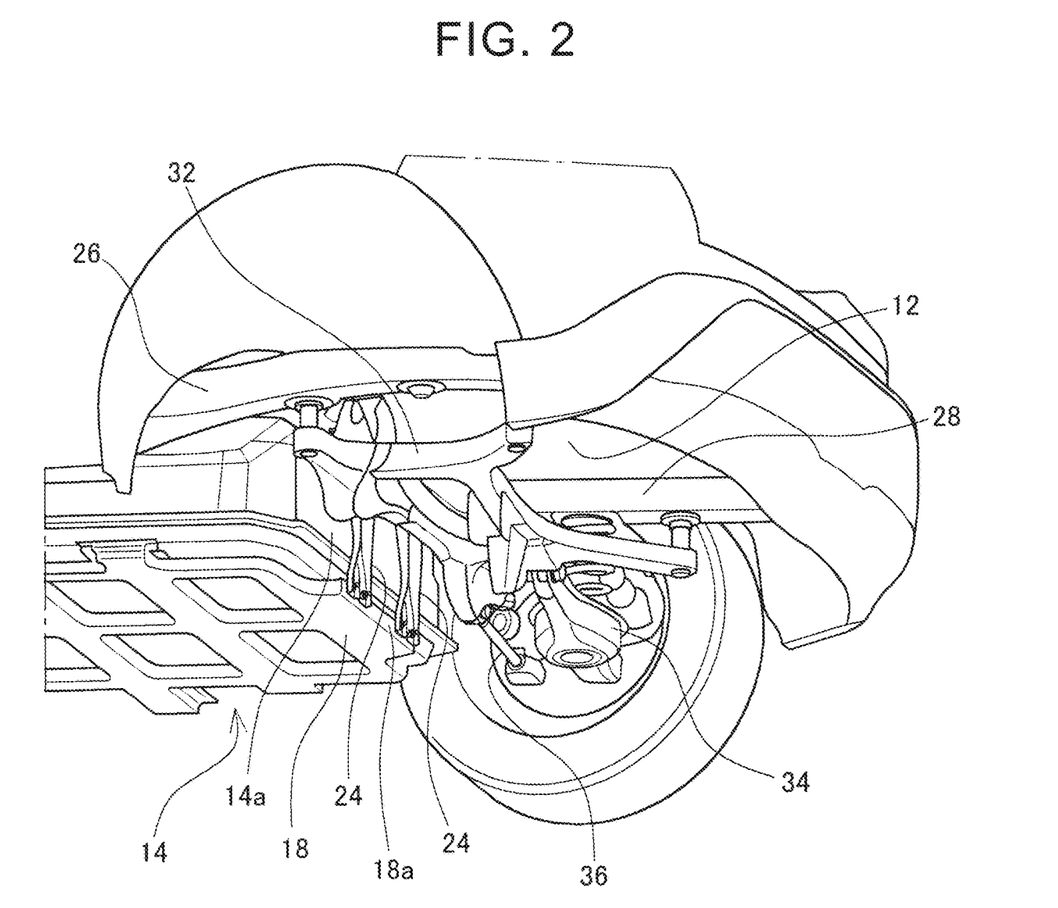
FIG. 2 is a view of a vehicle lower structure in a periphery of a rear axle in a state where a suspension member is mounted.
Figure 3:
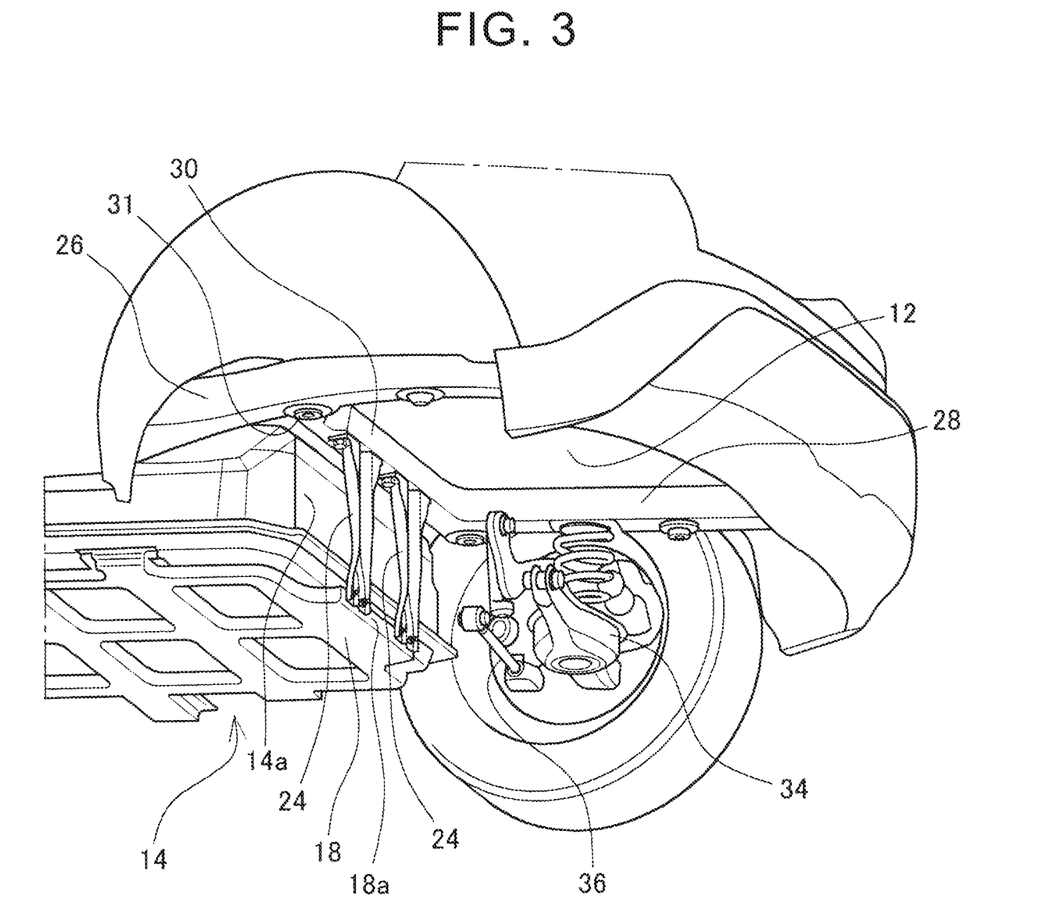
FIG. 3 is a view of the vehicle lower structure in the periphery of the rear axle in a state where the suspension member is removed.
Figure 4:
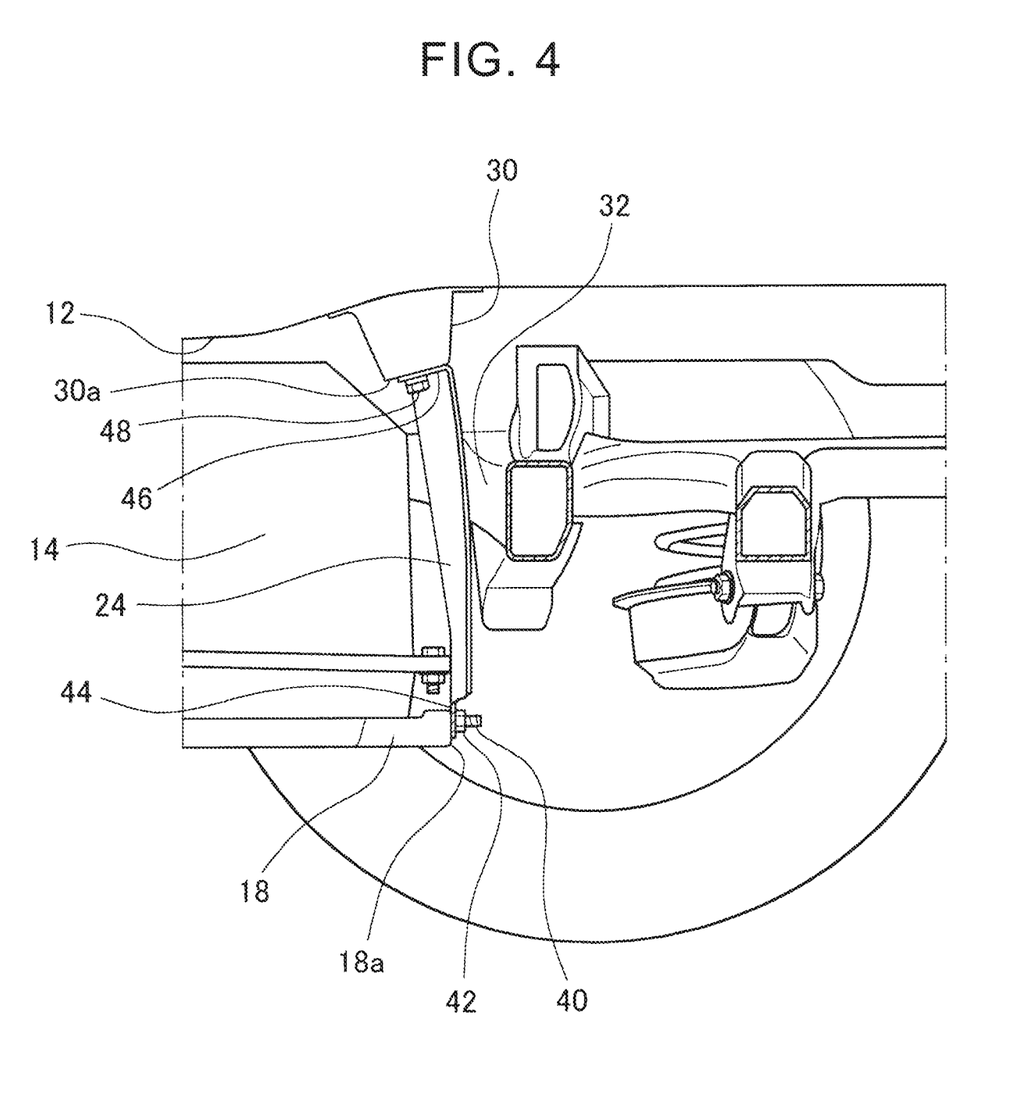
FIG. 4 is a side view of the periphery of the rear axle.
Figure 5:
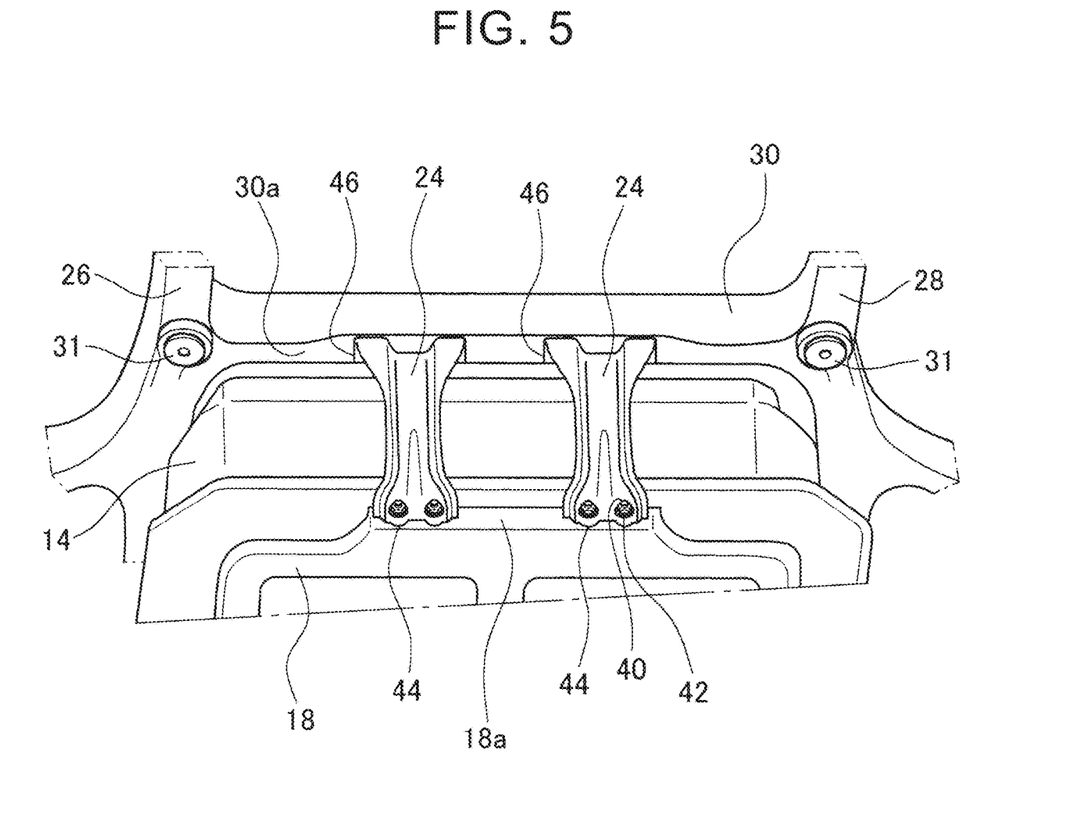
FIG. 5 is a view of a rear end surface of the battery pack and its periphery seen from below.

FIG. 2 to FIG. 5 are enlarged views of a main part of the vehicle lower structure 10 in the vicinity of the rear axle. FIG. 2 shows a state where the suspension member 32 is attached, and FIG. 3 shows the vehicle lower structure 10 in the vicinity of the rear axle in a state where the suspension member 32 is removed. FIG. 4 is a side view, and the suspension member 32 is broken along a median plane of the vehicle. FIG. 5 is a bottom view of the battery pack 14 and its periphery seen from the rear side.

As shown in FIG. 3, the cross member 30 is disposed under the floor 12, extends in the right-left direction between the under reinforcements 26, 28, and connects the under reinforcements 26, 28 with each other. At positions where the cross member 30 is connected with the under reinforcements 26, 28, mounting points 31 for the suspension member 32 are formed.

The rear end surface 18a of the support frame 18 is provided in a lower edge of the rear end surface 14a of the battery pack 14 so that the rear end surface 18a faces the rear side. Bolts 40 are provided on the rear end surface 18a so that the bolts 40 project to the rear side. The bolts 40 are fastening components that are used to connect a lower end portion of the hanging bracket 24 to the battery pack 14 in a detachable manner, and are hereinafter referred to as lower end portion fastening bolts 40. The lower end portion fastening bolts 40 may be, for example, weld bolts or stud bolts.

There are two hanging brackets 24 provided on the rear side of the rear end surface 14a of battery pack 14. In particular, the hanging brackets 24 can be disposed on an inner side in a vehicle width direction with respect to the suspension arms 34, 36 provided on the right and the left sides. Lower ends of the hanging brackets 24 are connected with the support frame 18 by using the lower end portion fastening bolts 40 and nuts 42. In FIG. 4, a part of the lower end of the hanging bracket 24 is broken in order to show the lower end portion fastening bolt 40 and the nut 42. In the lower end of the hanging bracket 24, a lower end confronting plate portion 44 is provided that faces the rear end surface 18a of the support frame and has a through-hole for the lower end portion fastening bolt 40 to pass through. The lower end confronting plate portion 44 is disposed almost vertically. As the lower end portion fastening bolt 40 is screwed into the nut 42, the lower end of the hanging bracket 24 is connected with the support frame 18. A position where the hanging bracket 24 and the support frame 18 are connected with each other is located below the suspension member 32.

An upper end of the hanging bracket 24 is connected with the cross member 30. The cross member 30 has a lower surface 30a that faces almost down. The lower surface 30a is provided with a through-hole, and a nut (not shown) is fixed inside the cross member 30 by welding and so on so as to align with the through-hole. The hanging bracket 24 has an upper end confronting plate portion 46 that faces the lower surface 30a of the cross member. The upper end confronting plate portion 46 also has a through-hole. In a state where the upper end confronting plate portion 46 is joined with the lower surface 30a of the cross member, a bolt 48 is connected with the nut inside the cross member 30 by screwing. Then, the upper end of the hanging bracket 24 is joined to the cross member 30. The bolt 48 is a fastening component that is used to connect the hanging bracket 24 with the cross member 30 in a detachable manner, and is hereinafter referred to as an upper end portion fastening bolt 48.

The hanging bracket 24 extends in a space between the battery pack 14 and the suspension member 32. In particular, since the hanging bracket 24 is connected with the lower surface 30a of the cross member, the hanging bracket 24 falls within a range of a thickness of the cross member 30. If the hanging bracket is connected with a rear surface of the cross member 30, there will be a large portion of the hanging bracket present on the rear side of the cross member 30, and interference with other component happens. By connecting the hanging bracket 24 with the lower surface 30a of the cross member, dimensions of the cross member 30 and the hanging bracket 24 in the front-rear direction can be reduced, and the rear end surface 14a of the battery pack can be moved rearward accordingly. This means that a capacity of the battery pack 14 can be increased. Further, because the lower surface 30a of the cross member is inclined so as to face slightly the rear side, the hanging bracket 24 is inclined so that its lower end is located on the rear side (suspension member 32 side) compared to its upper end, and the rear end surface 14a of the battery pack can be moved rearward. This contributes to an increase in the capacity of the battery pack 14.

The lower surface 30a of the cross member faces a space between the battery pack 14 and the suspension member 32. With this disposition, a tool such as a T-handle wrench can pass between the battery pack 14 and the suspension member 32 from below and be engaged with the upper end portion fastening bolt 48. Thus, the upper end portion fastening bolt 48 can be fastened or loosened in the state where the battery pack 14 is mounted.

When the battery pack 14 is attached to or detached from the floor 12, the lower end portion of each of the hanging brackets 24 is connected with or disconnected from the battery pack 14. When the battery pack 14 is attached, the hanging bracket 24 is first connected with the cross member 30, and then the support frame 18 of the battery pack 14 is connected with the lower end of the hanging bracket 24 by using the lower end portion fastening bolt 40 and the nut 42. When the battery pack 14 is removed, the nut 42 fastened to the lower end portion fastening bolt 40 is loosened and removed, and the hanging bracket 24 is disconnected from the support frame 18. Since the lower end portion of the hanging bracket 24 connected with the support frame 18 is located below the suspension member 32, the battery pack 14 can be attached or detached without removing the suspension member 32. Further, the movable parts of the suspension such as the suspension arms 34, 36 are located on the outer side with respect to the hanging bracket 24 in the right-left direction. Therefore, the battery pack 14 can be attached or detached without removing these parts.

As the hanging brackets 24 are connected with or disconnected from the cross member 30, the battery pack 14 can also be attached or detached in a state where the hanging brackets 24 are connected with the battery pack 14. As described earlier, a tool is allowed to pass between the battery pack 14 and the suspension member 32 so as to be engaged with the upper end portion fastening bolt 48. When the battery pack 14 is attached to the floor 12, the hanging brackets 24 are first connected with the support frame 18, and then the battery pack 14 is ascended in this state. Thereafter, the upper end portions of the hanging brackets 24 are connected with the cross member 30. At this point, the tool is able to pass between the battery pack 14 and the suspension member 32 and be engaged with the upper end portion fastening bolt 48. Therefore, the battery pack 14 can be attached in the state where the suspension member 32 is attached. When the battery pack 14 is removed, the tool passes between the battery pack 14 and the suspension member 32 and is engaged with the upper end portion fastening bolt 48 so that the upper end portion fastening bolt 48 is loosened and removed. This operation is also done in the state where the suspension member 32 is attached. The battery pack 14 is descended in the state where the hanging brackets 24 are connected with it, and then removed from the floor 12.

The fastening components that are used to connect each of the hanging brackets 24 and the support frame 18 with each other may be a combination of the nut fixed to the support frame 18, and a commonly-used bolt such as a hexagon headed bolt that is screwed to the nut. Further, the fastening components that are used to connect each of the hanging brackets 24 and the cross member 30 with each other may be a combination of a bolt erected on the cross member 30 such as a weld bolt or a stud bolt, and a nut that is screwed with the bolt When the type of the suspension is, for example, a torsion beam type where a movable part (a cross beam, and so on) extending between right and left wheels is provided, each of the hanging brackets 24 and the battery pack 14 may be connected with each other below the movable part. Thus, attachment and detachment of the battery pack 14 become possible without removing the movable part such as the cross beam that extends to the right and the left of the suspension. Further, the lower surface 30a of the cross member 30 is able to face a space between the battery pack 14 and the movable part extending to the right and the left of the suspension. Thus, each of the hanging brackets 24 is attached to and detached from the cross member 30 without removing the movable part that extends to the right and the left of the suspension, thereby making it possible to attach and detach the battery pack 14.

In the foregoing embodiment, a configuration in the periphery of the rear axle is described. A similar configuration may be used for a front axle.

What is claimed is:
1. A vehicle lower structure, comprising:
a floor of a vehicle;
a cross member that is provided under the floor and extends in a vehicle width direction;
a battery pack mounted under the floor;
a suspension member with which a movable part of a suspension is connected so that the movable part is able to operate, the suspension member being positioned on a front side or a rear side of the battery pack and fixed to a vehicle body; and
a hanging bracket that is hung from the cross member and is connected with an end surface of the battery pack on a suspension member side by a fastening component such that the hanging bracket supports the battery pack in a hanging manner,
wherein
the battery pack and the hanging bracket are connected with each other below the suspension member, and
the hanging bracket is inclined in a direction so that a lower end of the hanging bracket is distanced from the battery pack.
2. The vehicle lower structure according to claim 1, wherein
the hanging bracket extends in a vehicle upper-lower direction in a space between the battery pack and the suspension member, and
the cross member has a lower surface with which the hanging bracket is connected, and the lower surface faces the space between the battery pack and the suspension member.
3. The vehicle lower structure according to claim 1, wherein
the battery pack and the hanging bracket are connected with each other below the movable part of the suspension.
4. The vehicle lower structure according to claim 1, wherein
the floor includes an under reinforcement provided in an end of the floor in the vehicle width direction, the under reinforcement extending in a front-rear direction of the vehicle and
the suspension member is connected with the under reinforcements.
5. The vehicle lower structure according to claim 4, wherein the suspension member and the under reinforcements are connected directly.
6. The vehicle lower structure according to claim 4, wherein the suspension member and the under reinforcements are overlapped.
7. The vehicle lower structure according to claim 1, wherein the cross member is closer to the vehicle floor than the battery pack.
8. The vehicle lower structure according to claim 1, wherein the battery pack is detachably fastened to the hanging bracket.
9. The vehicle lower structure according to claim 1, wherein the hanging bracket one or more of curves or angles inward toward the battery pack such that a connection point between the upper cross member and the hanging bracket is located inward relative to a connection point between the battery pack and the hanging bracket.
10. A vehicle lower structure, comprising:
a floor of a vehicle;
a cross member extending in a vehicle width direction;
a battery pack mounted under the floor, wherein the cross member is closer to the vehicle floor than the battery pack;
a suspension member; and a hanging bracket detachably fastened to the cross member and detachably fastened to an end surface of the battery pack on a suspension member side such that the hanging bracket supports the battery pack in a hanging manner, wherein a connection point between the battery pack and the hanging bracket is on an opposite side of the suspension member from the vehicle floor, and the hanging bracket is inclined in a direction so that a lower end of the hanging bracket is distanced from the battery pack.

11. The vehicle lower structure according to claim 10, wherein the hanging bracket one or more of curves or angles inward toward the battery pack such that a connection point between the upper cross member and the hanging bracket is located inward relative to the connection point between the battery pack and the hanging bracket.

12. A vehicle lower structure, comprising:
a floor of a vehicle;
a cross member that is provided under the floor and extends in a vehicle width direction;
a battery pack mounted under the floor;
a suspension member with which a movable part of a suspension is connected so that the movable part is able to operate, the suspension member being positioned on a front side or a rear side of the battery pack and fixed to a vehicle body; and a hanging bracket that is hung from the cross member and is connected with an end surface of the battery pack on a suspension member side by a fastening component such that the hanging bracket supports the battery pack in a hanging manner, wherein the battery pack and the hanging bracket are connected with each other below the suspension member, the floor includes an under reinforcement provided in an end of the floor in the vehicle width direction, the under reinforcement extending in a front-rear direction of the vehicle, the suspension member is connected with the under reinforcements, and the suspension member and the under reinforcements are connected directly.

* * * * *